United States Patent
Land, III et al.

(10) Patent No.: US 10,619,874 B2
(45) Date of Patent: Apr. 14, 2020

(54) APPARATUSES, METHODS AND SYSTEMS FOR CONFIGURING ELECTRONICALLY PROGRAMMABLE HVAC SYSTEM

(71) Applicant: TRANE INTERNATIONAL INC., Piscataway, NJ (US)

(72) Inventors: Joseph George Land, III, Tyler, TX (US); Karl J. Mutchnik, Tyler, TX (US)

(73) Assignee: Trane International Inc., Davidson, NC (US)

( * ) Notice: Subject to any disclaimer, the term of this patent is extended or adjusted under 35 U.S.C. 154(b) by 600 days.

(21) Appl. No.: 14/921,247

(22) Filed: Oct. 23, 2015

(65) Prior Publication Data
US 2016/0116179 A1    Apr. 28, 2016

Related U.S. Application Data

(60) Provisional application No. 62/067,509, filed on Oct. 23, 2014.

(51) Int. Cl.
| | |
|---|---|
| *F24F 11/30* | (2018.01) |
| *F24F 11/62* | (2018.01) |
| *F24F 11/89* | (2018.01) |
| *F24F 11/64* | (2018.01) |
| *F24F 11/65* | (2018.01) |
| *F24F 11/59* | (2018.01) |

(Continued)

(52) U.S. Cl.
CPC ............. *F24F 11/30* (2018.01); *F24F 11/62* (2018.01); *F24F 11/89* (2018.01); *B60R 16/037* (2013.01); *B60R 25/00* (2013.01); *F24F 11/59* (2018.01); *F24F 11/64* (2018.01); *F24F 11/65* (2018.01); *F24F 2110/00* (2018.01); *F24F 2120/20* (2018.01); *F24F 2130/20* (2018.01); *G05B 15/02* (2013.01)

(58) Field of Classification Search
CPC ........ F24F 11/006; F24F 11/02; F24F 11/001; F24F 2011/0049; F24F 2011/0072; F24F 2011/0064; F24F 2011/0057; F24F 2011/0063
See application file for complete search history.

(56) References Cited

U.S. PATENT DOCUMENTS

| | | | |
|---|---|---|---|
| 6,415,023 B2 | 7/2002 | Iggulden | |
| 7,136,710 B1 * | 11/2006 | Hoffberg | ................. G06F 9/453 700/83 |

(Continued)

*Primary Examiner* — Mohammad Ali
*Assistant Examiner* — Kelvin Booker
(74) *Attorney, Agent, or Firm* — Taft Stettinius & Hollister LLP (57) ABSTRACT

Apparatuses, methods and systems for configuring electronically programmable heating, ventilation, and/or air conditioning ("HVAC") systems are disclosed. One embodiment is a system comprising a server system in operative communication with a database, a remote client and an electronically programmable HVAC controller. The system is structured to transmit a template HVAC configuration profile to the client, receive from the client a modification of the template profile transmitted to the remote client, validate the modification, in response to a programming request from the client, transmit a programming instruction including a modified HVAC configuration profile to the HVAC controller.

20 Claims, 5 Drawing Sheets

(51) Int. Cl.
*G05B 15/02* (2006.01)
*B60R 25/00* (2013.01)
*F24F 110/00* (2018.01)
*F24F 130/20* (2018.01)
*F24F 120/20* (2018.01)
*B60R 16/037* (2006.01)

(56) References Cited

U.S. PATENT DOCUMENTS

| | | | |
|---|---|---|---|
| 7,225,171 B2 | 5/2007 | Kikuchi et al. | |
| 7,437,150 B1 | 10/2008 | Morelli et al. | |
| 8,239,066 B2 | 8/2012 | Jennings et al. | |
| 8,594,850 B1 * | 11/2013 | Gourlay | G05B 15/02 700/276 |
| 9,417,637 B2 * | 8/2016 | Matsuoka | G05D 23/1904 |
| 9,459,018 B2 * | 10/2016 | Fadell | F24F 11/0009 |
| 9,851,728 B2 * | 12/2017 | Matsuoka | G05D 23/1919 |
| 10,082,312 B2 * | 9/2018 | Vozenilek | G05D 23/19 |
| 10,151,503 B2 * | 12/2018 | Matsuoka | G05D 23/1905 |
| 2001/0032278 A1 | 10/2001 | Brown et al. | |
| 2006/0200253 A1 * | 9/2006 | Hoffberg | G05B 15/02 700/19 |
| 2010/0298985 A1 | 11/2010 | Hess et al. | |
| 2011/0015802 A1 * | 1/2011 | Imes | G05D 23/1923 700/300 |
| 2011/0046792 A1 * | 2/2011 | Imes | H04L 63/105 700/278 |
| 2011/0202185 A1 * | 8/2011 | Imes | G05B 15/02 700/277 |
| 2011/0231320 A1 * | 9/2011 | Irving | G06Q 30/00 705/80 |
| 2011/0283190 A1 * | 11/2011 | Poltorak | G10L 13/033 715/716 |
| 2012/0046859 A1 * | 2/2012 | Imes | H02J 13/001 701/409 |
| 2012/0064923 A1 * | 3/2012 | Imes | G05B 15/02 455/457 |
| 2012/0232969 A1 * | 9/2012 | Fadell | G06Q 10/20 705/14.4 |
| 2012/0310416 A1 * | 12/2012 | Tepper | G05B 15/00 700/276 |
| 2013/0173064 A1 * | 7/2013 | Fadell | G05D 23/1902 700/276 |
| 2013/0334326 A1 * | 12/2013 | Shan | G08C 17/02 236/51 |
| 2013/0338839 A1 * | 12/2013 | Rogers | G05D 23/1904 700/278 |
| 2014/0052300 A1 * | 2/2014 | Matsuoka | F24F 11/0086 700/276 |
| 2014/0058567 A1 * | 2/2014 | Matsuoka | G05D 23/1917 700/276 |
| 2014/0156087 A1 | 6/2014 | Amundson | |
| 2014/0244047 A1 | 8/2014 | Oh et al. | |
| 2014/0262130 A1 * | 9/2014 | Yenni | G05B 23/0216 165/11.1 |
| 2014/0306833 A1 * | 10/2014 | Ricci | B60Q 1/00 340/901 |
| 2014/0309789 A1 * | 10/2014 | Ricci | B60Q 1/00 700/276 |
| 2014/0309806 A1 * | 10/2014 | Ricci | B60Q 1/00 701/1 |
| 2014/0309813 A1 * | 10/2014 | Ricci | B60Q 1/00 701/2 |
| 2014/0309862 A1 * | 10/2014 | Ricci | G01C 21/00 701/36 |
| 2014/0309863 A1 * | 10/2014 | Ricci | G01C 21/3484 701/36 |
| 2014/0309864 A1 * | 10/2014 | Ricci | H04W 4/21 701/36 |
| 2014/0310031 A1 * | 10/2014 | Ricci | H04W 4/40 705/5 |
| 2014/0310788 A1 * | 10/2014 | Ricci | G06F 16/583 726/6 |
| 2014/0316581 A1 * | 10/2014 | Fadell | G05D 23/1904 700/276 |
| 2014/0319232 A1 * | 10/2014 | Gourlay | F24F 11/0086 236/51 |
| 2014/0324232 A1 * | 10/2014 | Modi | G05D 23/1931 700/278 |
| 2015/0161515 A1 * | 6/2015 | Matsuoka | G05B 13/027 706/17 |
| 2015/0292985 A1 * | 10/2015 | Yenni | G05B 23/0221 702/182 |
| 2016/0102877 A1 * | 4/2016 | Griffin | F24F 11/006 700/276 |
| 2016/0116179 A1 * | 4/2016 | Land, III | F24F 11/30 700/276 |
| 2016/0139582 A1 * | 5/2016 | Matsuoka | G05B 15/02 700/276 |
| 2016/0261425 A1 * | 9/2016 | Horton | G05B 15/02 |
| 2017/0076263 A1 * | 3/2017 | Bentz | H04W 4/80 |
| 2017/0132689 A1 * | 5/2017 | Ogaz | G06Q 30/0631 |
| 2017/0146261 A1 * | 5/2017 | Rogers | F24F 11/0012 |
| 2018/0266718 A1 * | 9/2018 | Gillette | F24F 11/46 |
| 2018/0267701 A1 * | 9/2018 | Rigg | G06F 3/04847 |

* cited by examiner

Fig. 1

| 200 Template Profile | | |
|---|---|---|
| 210 Template Equipment Profile | | |
| OU Type = A | OU Stages = 2 | OU ... |
| Comp Type = B | Comp Stages = 1 | Comp ... |
| IU = Type C | IU Stages = 1 | IU ... |
| 220 Template Climate Profile | | |
| Region = Southeast | Sub-region = Costal | ... |
| 230 Template Customer Profile | | |
| Cool Pref Type = 1 | Heat Pref Type = 2 | ... |
| 240 Template HVAC System Configuration Parameters | | |
| Param A = 150 | Param B = 2.3 | ... |

| 300 Modified Profile | | |
|---|---|---|
| 310 Modified Equipment Profile | OU Stages = 2 | OU ... |
| OU Type = A | Comp Stages = 1 | Comp ... |
| Comp Type = B | IU Stages = 1 | IU ... |
| *IU = Type C1* | | |
| 320 Modified Climate Profile | Sub-region = Costal | ... |
| Region = Southeast | | |
| 330 Template Customer Profile | Heat Pref Type = 2 | ... |
| *Cool Pref Type = 3* | | |
| 340 Modified HVAC System Configuration Parameters | *Param B = 2 8* | |
| Param A = 170 | | |
| 350 Dealer/Installer ID | | |

| 400 HVAC System Record |
| --- |
| 410 Programmed Profile ID |
| 420 Dealer/Installer ID |
| 430 HVAC System ID |
| 440 Programming History |
| 450 Operational Information |
| 460 ... |

APPARATUSES, METHODS AND SYSTEMS FOR CONFIGURING ELECTRONICALLY PROGRAMMABLE HVAC SYSTEM

BACKGROUND

The present application generally relates to apparatuses, methods and systems for configuring electronically programmable heating, ventilation, and/or air conditioning ("HVAC") systems. Electronically programmable HVAC systems may programmed with a number of different configuration parameters which are utilized in controlling an HVAC system and which influence the performance of the HVAC system. Complications in configuring electronically programmable HVAC systems arise from a number of considerations. For example, HVAC systems are typically produced by a manufacturer and installed a dealer/installer. The manufacturer must generally define the parameters that control operation of the HVAC system as well as impose certain standardization to account for concerns such as product performance, safety and reliability. The manufacturer is also best positioned to optimize performance of specified systems for specified or defined environmental and/or use preference conditions. On the other hand the dealer/installer is best positioned to customize HVAC system configuration based upon information specific to a given HVAC system installation such as the particular HVAC equipment at an installation site and its configuration, weather/climate considerations at the installation site, customer preferences and other factors that are unique to a given installation. Coordinating the configuration actions of manufacturers and dealer/installers and accommodating both standardization and customization remains a significant unmet challenge for electronically programmable HVAC systems.

DISCLOSURE

For the purposes of clearly, concisely and exactly describing exemplary embodiments of the invention, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the invention is thereby created, and that the invention includes and protects such alterations, modifications, and further applications of the exemplary embodiments as would occur to one skilled in the art.

SUMMARY

One embodiment is a unique system for configuring electronically programmable HVAC systems. Other embodiments include apparatuses, methods, and tools for configuring electronically programmable HVAC systems. Further embodiments, forms, features, aspects, benefits, and advantages of the present application shall become apparent from the description and figures provided herewith.

DETAILED DESCRIPTION OF ILLUSTRATIVE EMBODIMENTS

Figure 1:
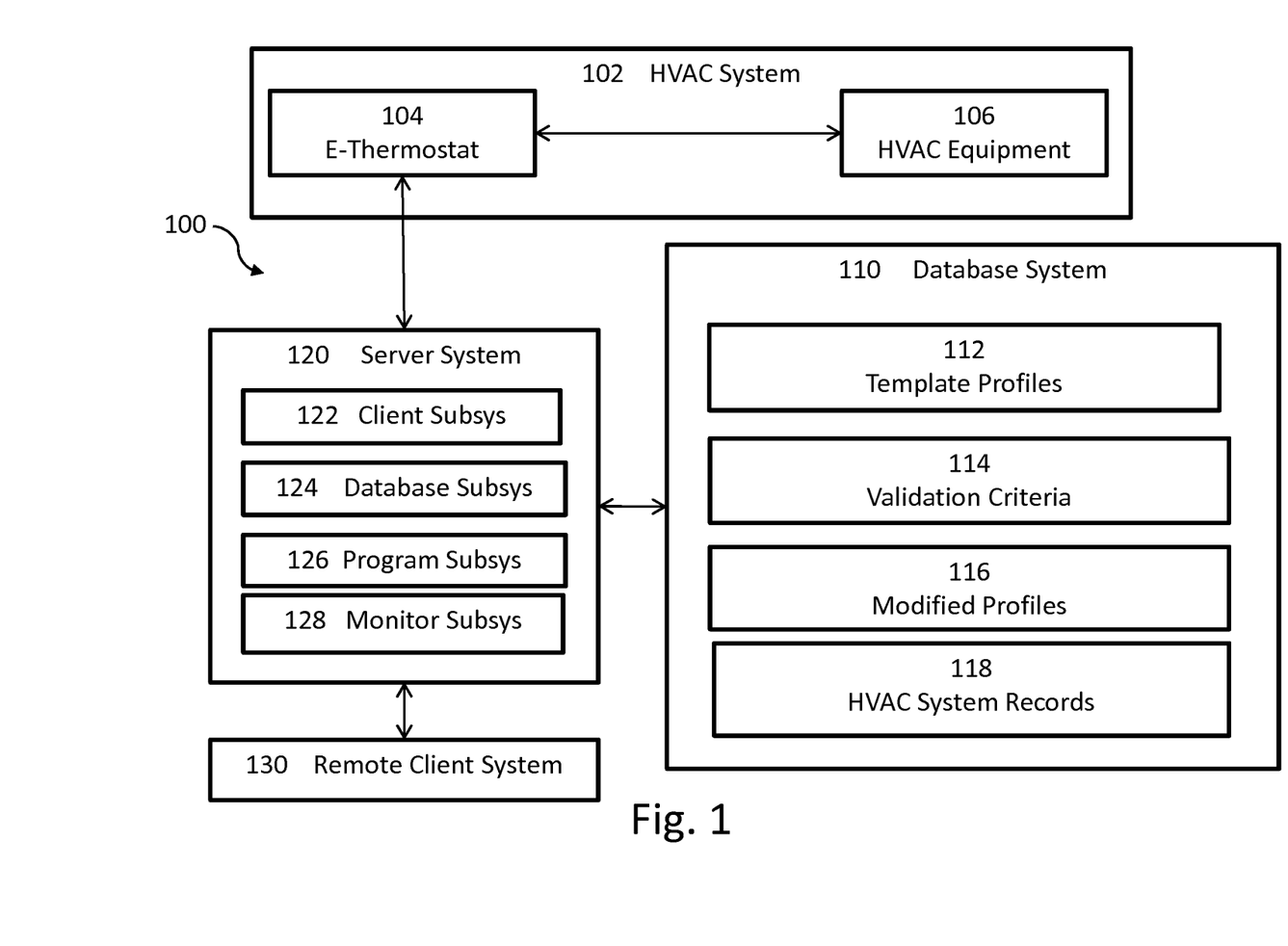
FIG. 1 is a schematic diagram of an exemplary system for configuring an electronically programmable HVAC system.

With reference to FIG. 1 there is illustrated an exemplary system 100 for configuring an electronically programmable HVAC system 102. HVAC system 102 includes an electronically programmable HVAC system controller 104 which is in operative communication with and structured to control HVAC equipment 106. Controller 104 is preferably structured as an electronically programmable thermostat which is operatively coupled with a communication network. Controller 104 may be in wireless or wired communication with the communication network. Where wireless communication is used, controller 104 may include a wireless transceiver such as a WIFI, Z-Wave, and/or Bluetooth transceiver. The communication network may comprise the public Internet, private communication networks such as cellular networks, a local area network (LAN), a wide area network (WAN) or other private IP networks, as well as combinations of the foregoing and other types of networks. HVAC equipment 106 may comprise a wide variety of components and configurations of equipment in an HVAC system such as an air conditioner, fan, compressor, furnace, heat pump, and air handlers, to name several examples.

While only a single HVAC system 102 is illustrated in FIG. 1, it shall be understood that system 100 is preferably structured to be in operative communication with a plurality of HVAC systems including respective electronically programmable HVAC controllers and HVAC equipment. The plurality of HVAC systems may be in a variety of geographic locations. Furthermore, each of the plurality of HVAC systems may include different types of HVAC controllers, different types and configurations of HVAC equipment, different climate or weather environments, and/or customers or system operators with different needs and preferences.

System 100 includes server system 120 and database system 110. Server system 120 includes one or more servers which are structured (either individually or collectively) to implement a number of particular subsystems. In the illustrated embodiment the implemented subsystems include client subsystem 122, database subsystem 124, programming subsystem 126, and monitoring subsystem 128. It shall be appreciated that a variety of additional subsystems may also be implemented in server system 120.

Client subsystem 122 is generally structured to provide data to and receive data from remote client system 130. Client subsystem 122 is preferably further structured to provide the additional particular functionalities and interaction between server system 120 and remote client system 130 which are described herein. Client subsystem may include one or more cloud modules that allows HVAC dealers access and interact with various subsystems and services available in server system 120 from any location in which a compatible network connection is available. An exemplary cloud module is structured to provide a dealer portal through which view and interact with a graphical user interface generated server system 120 or initiated by server system 120 and dynamically generated on remote client system 130.

Database subsystem 124 is generally structured to write data to, search, and retrieve data from database system 110. Database subsystem 124 is preferably further structured to provide the additional particular functionalities and interaction between server system 120 and database system 110 which are described herein.

Programming subsystem 126 is generally structured to provide configuration programming instructions to controller 104 of HVAC system 102 and receive data pertaining to the configuration programming instructions from controller 104. Programming subsystem 124 is preferably further structured to provide the additional particular functionalities and interactions relating to configuration programming which are described herein.

Monitoring subsystem 128 generally structured to receive and store information received from controller 104 relating to the operation of HVAC system 102. Monitoring subsystem 128 is preferably further structured to provide the additional particular functionalities and interaction relating to HVAC system operation which are described herein.

Database system 110 includes one or more non-transitory computer readable memory storage devices which are structured (either individually or collectively) to implement one or more databases. It shall be understood that the term database encompasses a variety of types of data storage systems as would occur to one of skill in the art and that the term database may refer to a single database or to multiple databases which collectively provide database functionality or functionalities. In the illustrated embodiment database system 110 is structured to store one or more template HVAC configuration profiles 112, one or more validation criteria 114, one or more modified HVAC configuration profiles 116, and one or more HVAC system records 118. It shall be appreciated that database system 110 may also be structured to store a variety of other information and data structures.

Figure 2:
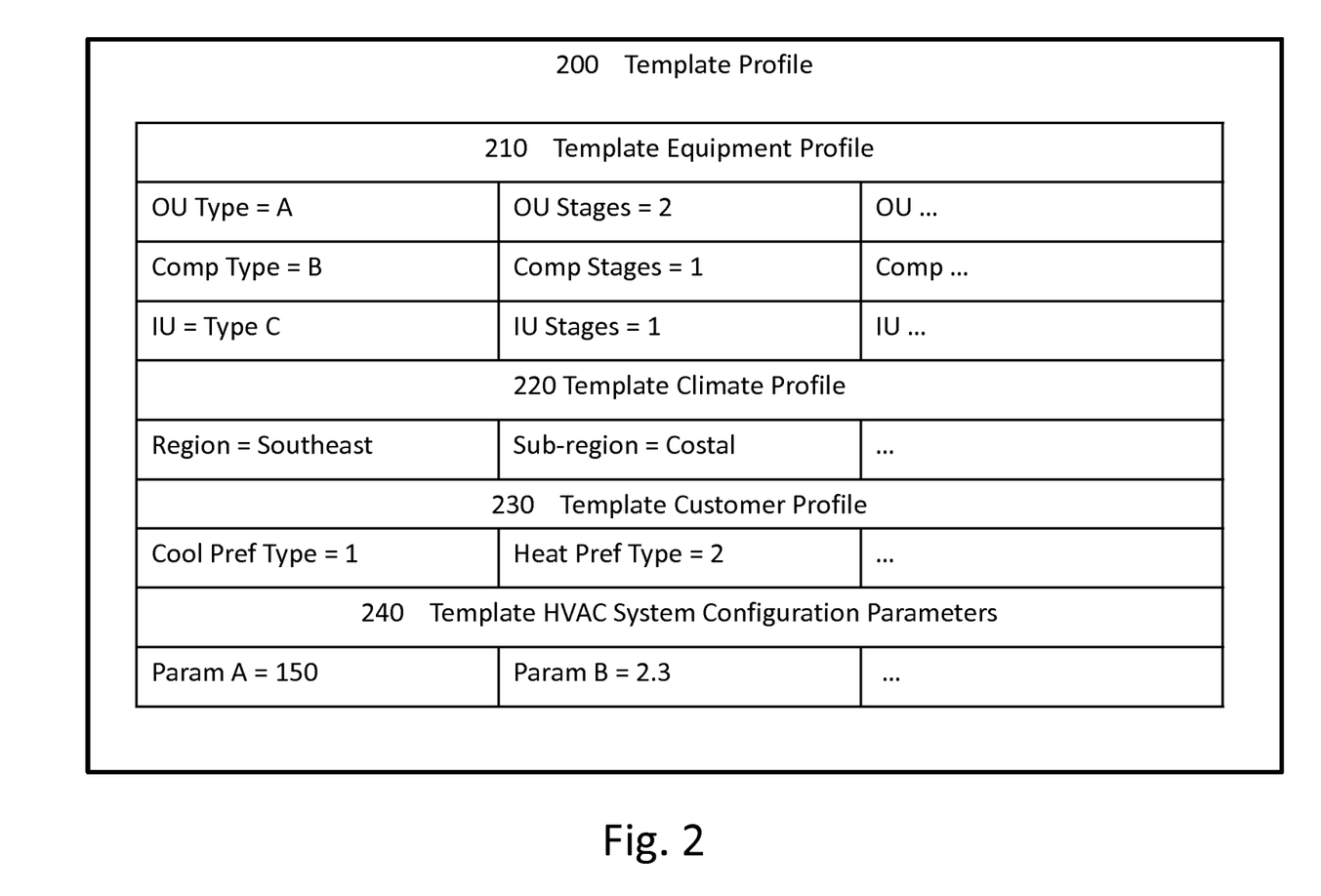
FIG. 2 illustrates an exemplary template HVAC system configuration profile.

Template HVAC configuration profiles 112 preferably include an equipment attribute indicating a predefined characteristic of an HVAC system or component(s) thereof, a climate attribute indicating a predefined characteristic of weather or climate, a customer type attribute indicating a predefined preference of an HVAC system user, and a plurality of HVAC system configuration parameters predetermined to provide HVAC system performance corresponding to the respective equipment attribute, climate attribute and customer type attribute. The predefined characteristics of template HVAC configuration profiles 112 are preferably based upon generic or model characteristics not particular to any particular installation or user. One example of a template HVAC configuration profile is illustrated in FIG. 2 which is further described below.

Validation criteria 114 are preferably based upon one or more predetermined criteria for the plurality of HVAC system configuration parameters which are specified in a HVAC configuration profile. The predetermined criteria may take the form of constraints, limits, rules or combinations thereof. In certain forms the one or more predetermined criteria may be specified based on safety considerations, reliability considerations, performance considerations and other considerations predetermined by an HVAC system manufacturer. Examples of validation criteria may include constraints, limits, rules or combinations thereof respecting or minimum run time, balance points, furnace/heat pump/dual settings, cooling droop, dead band, and zone weights among others. The validation criteria 114 are preferably effective permit a range of modification and customization of a template profile by a dealer/installer interacting with the remote client while also constraining the modification and customization based on standardization criteria established by a manufacturer.

Figure 3:
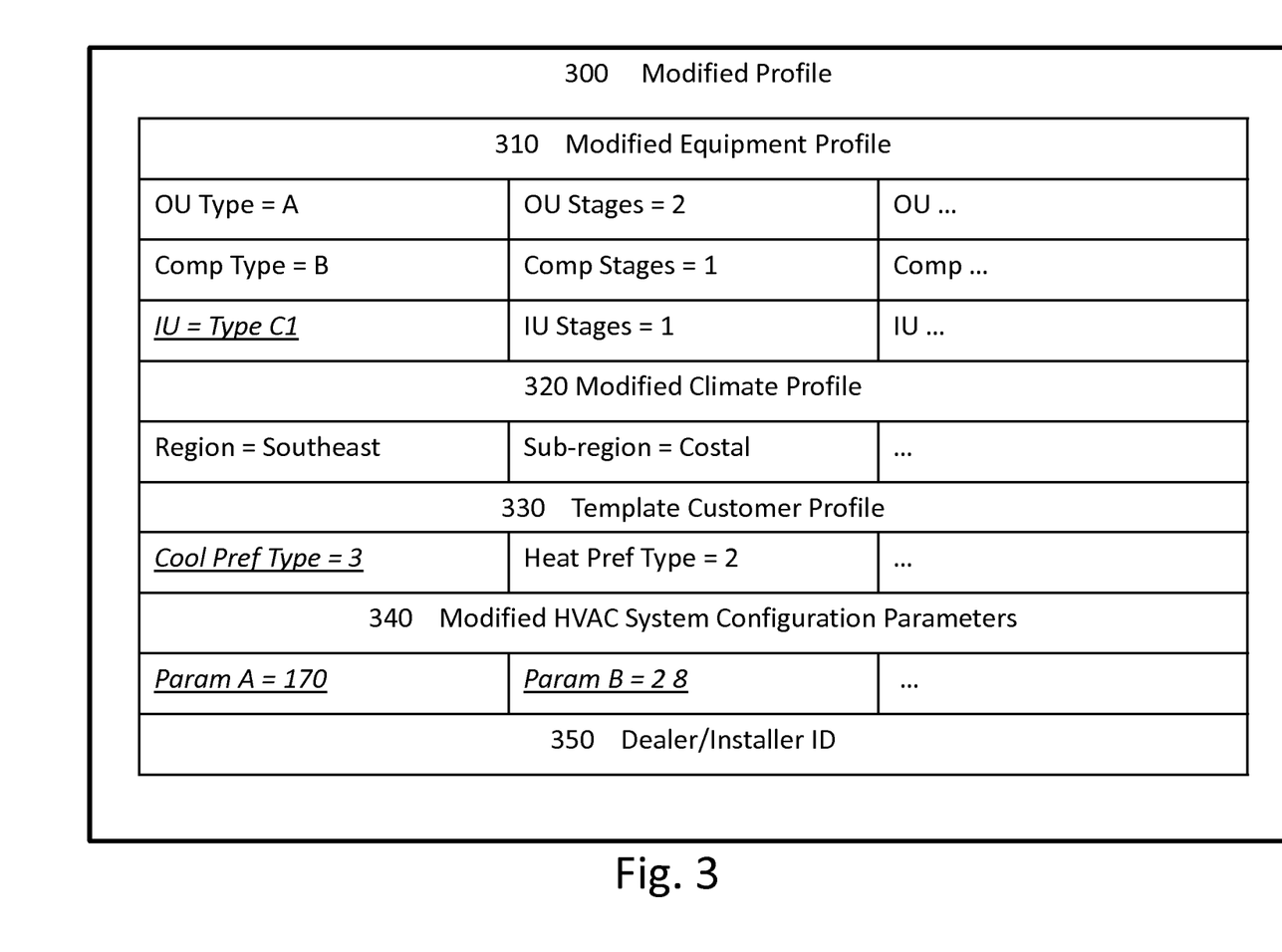
FIG. 3 illustrates an exemplary modified HVAC system configuration profile.

Modified HVAC configuration profiles 116 preferably include a modification to one or more of an equipment attribute indicating a characteristic of an HVAC system or a component thereof, a climate attribute indicating a characteristic of weather or climate, a customer type attribute indicating a preference of an HVAC system user, and a plurality of HVAC system configuration parameters of a template HVAC configuration profile. One example of a modified HVAC configuration profile is illustrated in FIG. 3 which is further described below.

Figure 4:
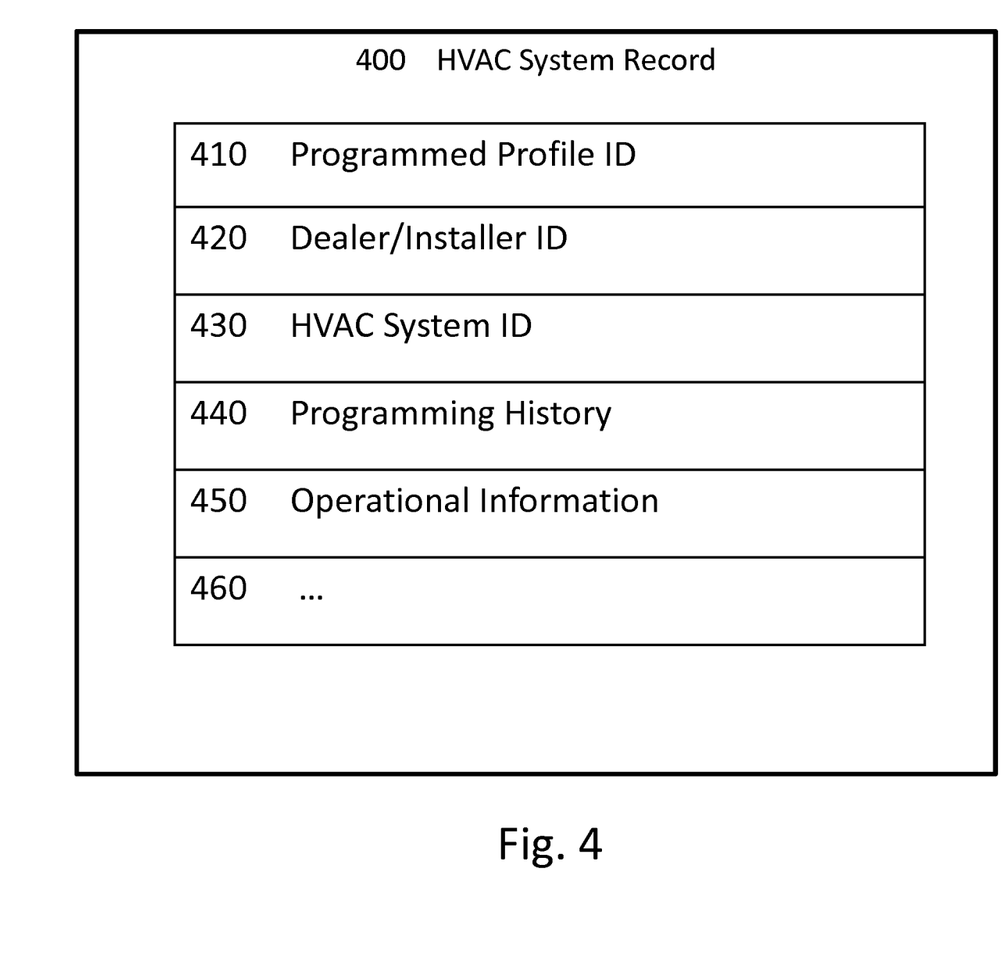
FIG. 4 illustrates an exemplary HVAC system record.

HVAC system records 118 include an identification of a modified HVAC configuration profile, a dealer/installer identification, and a HVAC system identification and may also include HVAC system operation data from controller 104 of system 102. One example of an HVAC system records is illustrated in FIG. 4 which is further described below.

Server system 120 provides a number of functionalities and interactions with client system 130. Client system 130 may be provided in a number of forms including a desktop or laptop computer, tablet computer, smart phone, or other computing device structured to implement one or more remote client application for interfacing with server system 120.

Server system 120 may be structured to provide a variety of services to remote client system 130. In certain embodiments server system 120 may provide a user interface which can provide or generate a display at client system 130 including some or the complete set of current configuration settings for an HVAC system with appropriate highlighting of variations from one or more selected baseline templates. The user interface may include a parameter category that illustrates some examples of parameters and/or settings such as outdoor unit type, number outdoor unit stages, compressor type, indoor unit type, hydronic type, number of indoor heat stages, and outdoor sensor enable. The user interface may include an installed category illustrating the type of parameter installed for that system. The user interface may include a template category that lists which template the parameter is in. Other categories of parameters and/or settings in addition to or in place of those shown are contemplated. It is contemplated that the user interface may be different various implementations and/or embodiments. Other examples of configuration data or parameters and/or settings may include: min run time, balance point, furnace/heat pump/dual, cooling droop, dead band, zone weights, and/or any other information relevant to an HVAC system. In certain forms the user interface may be structured to selectably display the data and/or layout illustrated in any of FIGS. 2-4.

In certain embodiments server system 120 may allow a client system 130 to connect to the server system 120 to perform various functions with respect to the templates and/or HVAC controllers. For example, server system 120 may facilitate the ability of the client system 130 to specify and program the configuration of the controller 104 at a customer's site, to compare a configuration to "known good" templates, and/or to load a pre-configured set of parameters via a template customized to the controller 104. As another example, server system 120 may allow the client system 130 to remotely view system configuration parameters for installed systems. In yet another example, the server system 120 may allow the client system 130 to establish (create), edit, and/or manage templates of configuration parameters and/or settings applicable in the local market where the customer site is located. In another example, the server system 120 may allow the client system 130 to efficiently compare the parameters and/or settings in place on the installed system (e.g., controller 104) to one or more pre-defined templates. In yet another example, the server system 120 may allow the client system 130 to remotely push individual and/or bulk parameters or settings to the installed system (e.g., controller 104). Server system 120 may allow dealers to log onto a website (e.g., hosted by the server system 120) and setup and/or edit templates of parameters and/or settings for various situations relevant to their market. The templates may selected based on predetermined defaults and may be customized modified from manufacturer samples. The dealer via the user interface 110 may push individual or full template sets of parameters and/or settings to one or more controllers 106 if the customer has authorized the server system 120 and/or client system 130 to allow the dealer to implement remote changes. The various functions and/or operations that a dealer may perform may be accomplished anywhere with Internet access including on a computer at the dealer location or a smartphone/tablet at the job (customer) site.

Server system 120 may be utilized in a process for managing configuration templates for a plurality of HVAC system controllers. In an exemplary process server system 120 maintains a collection or database of configuration templates. Server system 120 may provide a web portal or web site via for managing and/or maintaining the configuration templates. Server system 120 may receive one or more requests from client system 130. Client system 130 via a user interface may request to create, view, edit, push, and/or perform other functions with respect to the templates stored by the server system 120 or receive configuration data for one or more HVAC controllers in operative communication with server system 120. Server system 120 may perform one or more actions based on the one or more requests from the client system 130. For example, server system 120 may create, publish, change, push, and/or perform other functions requested by the client system 130 if the client system 130 and/or dealer associated with the client system 130 is authorized to do so. Further aspects of processes performed by server system 120 are described herein.

The processes implement by server system 120 may provide a variety of programming and template customization functionalities. In one aspect an HVAC system manufacturer can create a superset of template configuration profiles with assigned attributes such as applicable equipment, recommended equipment, applicable controls, recommended controls, applicable weather profile, recommended weather profile, customer type (e.g. energy conscious, allergic occupants, comfort first, etc.) and/or other assigned attributes. In another aspect dealer/installers may be presented with a subset of configuration profiles based on specified attributes such as geographic location, weather profile, types of equipment, and controls installed and serviced. This information is preferably selected to allow for filtering or selection of the dealer created templates. In a further aspect dealer/installers may modify selected template configuration profiles with their unique preferences for their market/customers/weather patterns and save the customized general profiles along with attributes for use in sorting, searching, and organizing the customized profiles. In a further aspect when a dealer/installer installs or services the HVAC equipment, they can log onto the portal and select the customized template best suited for the customer, or chose to replicate the profile of another one of the dealer's customer controls (access rights are limited to only allow viewing controls assigned to and managed by that dealer), and push the profile to the customer's control subject to verification by the server system as described herein. A dealer/installer may optionally modify a profile to customize it for a specific installation before pushing to the device. A dealer/installer may assign additional custom tracking attributes to the customer/profile pair for later sorting and analysis. A dealer/installer can view system performance data of their individual customers as well as aggregate data for aggregation attributes like control type, equipment type, profile used, and the custom tracking attributes.

With reference to FIG. 2 there is illustrated an exemplary template HVAC system configuration profile 200. Profile 200 includes template HVAC system equipment profile 210 which specifies one or more attributes of an HVAC system or components thereof. In the illustrated embodiment, profile 210 includes values for an outdoor unit type, a number of outdoor unit stages, a compressor type, a number of compressor stages, an indoor unit type and a number of indoor unit stages. It shall be appreciated that profile 210 may further include values for a number of additional attributes of the outdoor unit, compressor and indoor unit, as well as attributes of other HVAC system equipment.

Profile 200 includes template climate profile 220 which specifies one or more attributes of a weather or climate region. In the illustrated embodiment, the climate attributes are provided as geographic regions and sub-regions which are further associated with historical data and/or forecast weather and climate information, such as high and low temperatures for various time intervals (e.g., months, weeks or other time intervals), humidity values, sunshine or cloud cover values, and/or other types of weather and climate information. It shall be appreciated that such values may also be provided directly in profile 210.

Profile 200 further includes template customer profile 230 which specify customer preference attributes. The customer preference attributes may indicate customer preferences such as whether or a degree to which an HVAC system user is energy conscious, has allergy conditions, prefers heating ranges or cooling ranges associated with comfort or other attributes relating to customer preferences for HVAC system operation.

Profile 200 further includes template HVAC system configuration parameters 240 which are predetermined to provide HVAC system performance corresponding to the respective equipment attribute, climate attribute and customer type attribute.

With reference to FIG. 3 there is illustrated an exemplary modified HVAC system configuration profile 300. Profile 300 includes modified HVAC system equipment profile 310 which may include one or more modifications to template attributes of an HVAC system or components thereof. In the illustrated embodiment the modification is to the indoor unit type value as indicated with italics and underlining. Profile 300 further includes modified climate profile 320 which may include one or more modifications to template climate attributes. In the illustrated embodiment no modification has been made to the template values. Profile 300 further includes modified customer profile 330 which may include one or more modifications to template customer preference attributes. In the illustrated embodiment the modification is to the cooling preference type as indicated with italics and underlining. Profile 300 further includes modified HVAC system configuration parameters 340 which may include one or more modifications to template HVAC system configuration parameters. In the illustrated embodiment the modification is to parameters A and B as indicated with italics and underlining.

In certain embodiments a dealer/installer may directly specify each of the modifications to a modified HVAC system configuration profile. In certain other embodiments a dealer/installer may specify only certain modifications and server system 120 may determine additional modifications based on the dealer/installer modifications. In one example, the dealer/installer may provide one or more modifications to one or more of profile 310, 320 and 330 and server system 120 can determine and implement further modifications to HVAC system configuration parameters 340 based thereon. This may be accomplished using techniques such as interpolation between template profiles, mathematical augmentation (e.g., parameter multipliers, divisors or coefficients), regression analysis techniques and combinations of these and other techniques.

With reference to FIG. 4 there is illustrated an exemplary HVAC system record 400 which is associated with a particular HVAC system controller. Record 400 includes programmed profile identification field 410 which specifies a modified profile that has been programmed into a particular HVAC system controller. Record 400 further includes a dealer/installer identification field 420 which is associated with the particular HVAC system controller. Record 400 further includes an HVAC system identification field for the particular HVAC system controller. Record 400 further includes a programming history field 440 which is structured to store the configuration programming history of the particular HVAC system controller. Record 400 further includes operation information field 440 which is structured to store information relating to the operation history of the particular HVAC system controller.

Figure 5:
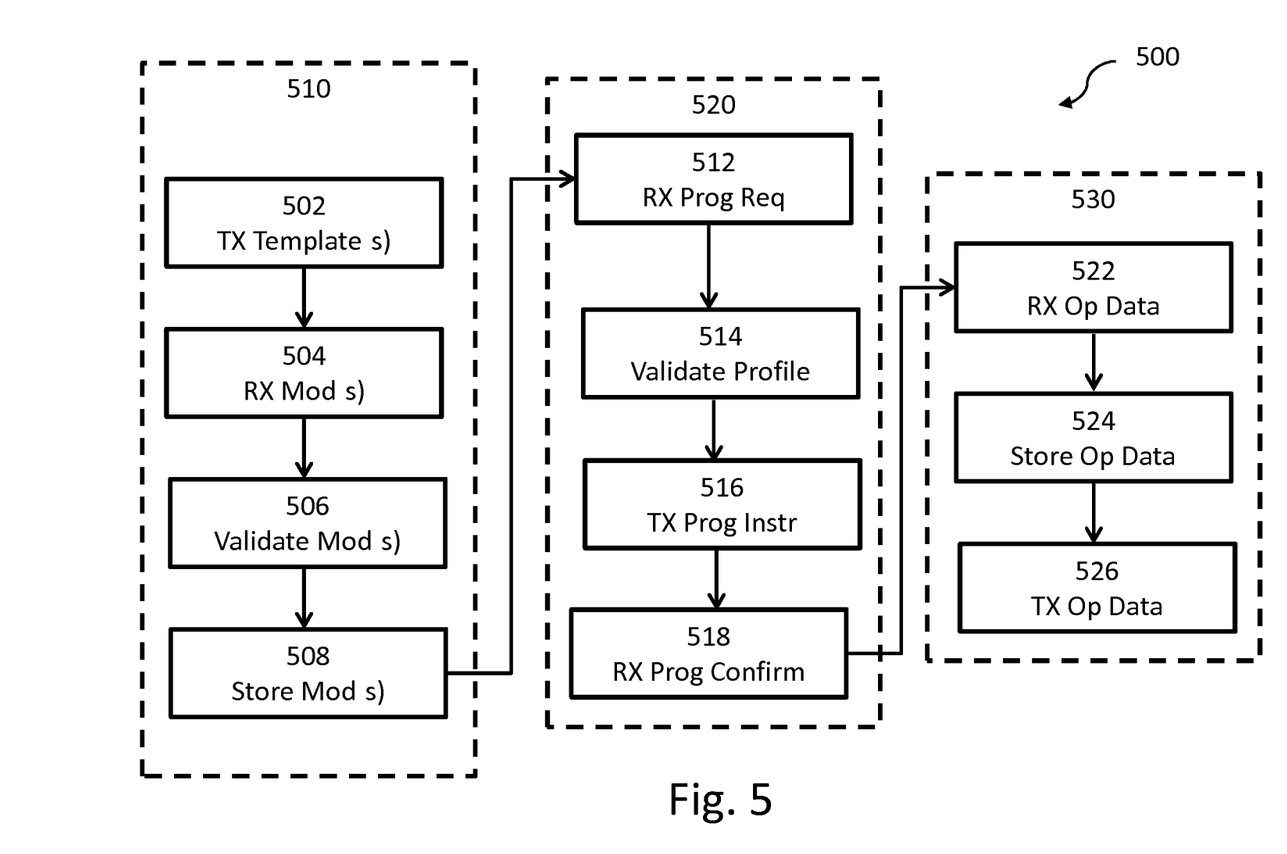
FIG. 5 is a flow diagram illustrating an exemplary process for configuring an electronically programmable HVAC system.

With reference to FIG. 5 there is illustrated a flow diagram of an exemplary process 500 for configuring a programmable HVAC system. Process 500 may be implemented in and performed by system 100 or in a variety of other systems structured to configure an electronically programmable HVAC system. It shall be appreciated that the variations and modifications described herein for various system components and configurations are also applicable to the components and configurations referred to in connection with process 500.

Process 500 begins at operation 502 in which a server system transmits one or more template HVAC configuration profiles to a remote client based upon a request received from the remote client. Operation 502 may obtain template HVAC configuration profiles from a database structured to store a plurality of template HVAC configuration profiles. Each of the template HVAC configuration profiles may include an equipment attribute, a climate attribute, a customer type attribute, and a plurality of HVAC system configuration parameters predetermined to provide HVAC system performance corresponding to the respective equipment attribute, climate attribute and customer type attribute of the template configuration profile. The request preferably includes a dealer/installer identification and at least one attribute of a template HVAC configuration profile operation 502 can utilize in selecting or identifying template HVAC configuration profiles appropriate for transmission to the remote client. From operation 502, process 500 proceeds to operation 504.

At operation 504, the server system receive from the remote client a modification of at least one template HVAC configuration profile transmitted to the remote client. The modification preferably includes a change to at least one of the plurality of HVAC system configuration parameters of the at least one template HVAC configuration profile transmitted to the remote client. The modification may take a number of forms. In certain forms a complete modified HVAC configuration profile may be transmitted to the server system by the remote client. In certain forms only data and/or instructions for changes to certain attributes of the template HVAC configuration profile may be transmitted to the server system by the remote client. In certain forms only certain modified information be transmitted to the server system by the remote client and the server system may further modify a template profile based on the transmitted modifications. From operation 504, process 500 proceeds to operation 506.

At operation 506, the server system validates the modification received from the remote client. The validation is preferably based upon one or more predetermined criteria for the plurality of HVAC system configuration parameters. The predetermined criteria may take the form of constraints, limits, rules, maxima, minima or combinations thereof. In certain forms the one or more predetermined criteria may be specified based on safety considerations, reliability considerations, performance considerations and other considerations predetermined by an HVAC system manufacturer. The validation performed at operation 506 may be effective permit a range of modification and customization of a template profile by a dealer/installer interacting with the remote client while also constraining the modification and customization based on criteria established by a manufacturer. In certain forms operation 506 may be omitted and a validation operation may be performed at a later operation, for example, operation 514 described below. In certain forms validation operations may be performed at both operations 506 and a later operation, for example, operation 514 described below. From operation 506, process 500 proceeds to operation 508.

At operation 508, the server system stores one or more modified HVAC configuration profiles in a database which may be associated with the server system and may be the same database storing the template HVAC configuration profiles or a separate database. It shall be understood that the term database encompasses a variety of data stores as would occur to one of skill in the art and that the term database may refer to a single database or to multiple databases in operative communication with the server system. The modified HVAC configuration profile stored in the data store incorporates the modification received from the remote client and is also associated with the dealer/installer identification. From operation 508, process 500 proceeds to operation 512.

At operation 512, the server system receives from the remote client an HVAC programming request. The programming request preferably includes a dealer/installer identification, an HVAC system identification, and an identification of the modified HVAC configuration profile. In certain embodiments, after receiving this information operation 512 may store in the database an HVAC system record including an identification of the modified HVAC configuration profile, the dealer/installer identification, and the HVAC system identification. From operation 508, process 500 proceeds to operation 514.

At operation 514 the server system validates the modified HVAC configuration profile associated with the programming request received from the remote client. The validation is preferably based upon one or more predetermined criteria for the plurality of HVAC system configuration parameters. The validation may be further based upon information specific to the features of the HVAC system identified by the HVAC system identification associated with the programming request received from the remote client. The predetermined criteria may take the form of constraints, limits, rules, maxima, minima or combinations thereof. In certain forms the one or more predetermined criteria may be specified based on safety considerations, reliability considerations, performance considerations and other considerations predetermined by an HVAC system manufacturer. The validation performed at operation 514 may be effective permit a range of modification and customization of a template profile by a dealer/installer interacting with the remote client while also constraining the modification and customization based on criteria established by a manufacturer. In certain forms operation 514 may be omitted and a validation operation may be performed at a prior operation, for example, operation 506 described above. In certain forms validation operations may be performed at both operations 514 and a prior operation, for example, operation 506 described above. From operation 514, process 500 proceeds to operation 516.

At operation 516 the server system, in response to the programming request received from the remote client, transmits a programming instruction including the modified HVAC configuration profile to a remote electronically programmable HVAC controller associated with the HVAC system identification. The programming instruction is preferably adapted to program the remote electronically programmable HVAC controller with the modified HVAC configuration profile. The programming instruction may also be adapted to cause the remote electronically programmable HVAC controller to transmit a confirmation of the requested configuration programming. From operation 516, process 500 proceeds to operation 518.

At operation 518 the server system receives from the remote client a confirmation of the status of the requested configuration programming. The confirmation preferably includes an HVAC system identification, and an identification of whether the requested programming was successful. Operation 518 may store this information in the store in the HVAC system record of the database. From operation 518, process 500 proceeds to operation 522.

At operation 522 the server system receives HVAC system operation data from the remote electronically programmable thermostat. The operation information may include information relating to the operation history of the HVAC system from which system efficiency evaluations can be performed. From operation 522, process 500 proceeds to operation 524.

At operation 524 the server system receives store the operation data in the HVAC system record of the database. From operation 542, process 500 proceeds to operation 526. At operation 526 the server system transmits the HVAC system record to the remote client.

The operations of process 500 may be performed in operation groups which may be performed as subsets of an overall control process. In the illustrated embodiment operation group 510 includes operations 502-508 which are effective to provide modified profiles in a server system based on predetermined template profiles. Operation group 520 includes operations 510-518 which are effective to configure an electronically programmable HVAC controller. Operation group 530 includes operations 522-526 which are effective to monitor and report to a client operational data of an HVAC system. It shall be appreciated that other operation groupings may also be utilized, for example, operations 504-506 may comprise an operation group separate from operation 502 in instances in which more extensive modification of template information by a dealer/installer is performed.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. A system for configuring a programmable HVAC system, the system comprising:
    a database structured to store a plurality of template HVAC configuration profiles, each of the template HVAC configuration profiles including an equipment attribute, a climate attribute, a customer type attribute, and a plurality of HVAC system configuration parameters predetermined to provide HVAC system performance corresponding to the respective equipment attribute, climate attribute and customer type attribute of the template configuration profile;
    a server system operatively coupled with the database, the server system being structured to:
    transmit one or more of the plurality of template HVAC configuration profiles to a remote client based upon a request received from the remote client, the request including a dealer/installer identification and at least one attribute of a template HVAC configuration profile,
    receive from the remote client a modification of at least one template HVAC configuration profile transmitted to the remote client, the modification including a change to at least one of the plurality of HVAC system configuration parameters of the at least one template HVAC configuration profile transmitted to the remote client,
    validate the modification based upon at least one predetermined criterion for the plurality of HVAC system configuration parameters,
    store in the database a modified HVAC configuration profile incorporating the modification received from the remote client, the modified HVAC configuration profile being associated with the dealer/installer identification,
    receive from the remote client an HVAC programming request, the programming request including the dealer/installer identification, an HVAC system identification, and an identification of the modified HVAC configuration profile, and
    in response to the programming request transmit a programming instruction including the modified HVAC configuration profile to a remote electronically programmable HVAC controller associated with the HVAC system identification, the programming instruction being adapted to program the remote electronically programmable HVAC controller with the modified HVAC configuration profile.

2. The system of claim 1 wherein the server system is further structured to store in the database an HVAC system record including an identification of the modified HVAC configuration profile, the dealer/installer identification, and the HVAC system identification.

3. The system of claim 2 wherein the server system is further structured to:
receive HVAC system operation data from the remote electronically programmable thermostat, and
store the operation data in the HVAC system record of the database.

4. The system of claim 1 wherein the server system is further structured to transmit the HVAC system record to the remote client.

5. The system of claim 1 wherein the electronically programmable HVAC controller is an electronically programmable thermostat.

6. The system of claim 1, wherein the server system is in operatively communication with the electronically programmable HVAC controller via the public Internet.

7. The system of claim 1 further comprising the remote client, wherein the remote client is implemented in a mobile computing device.

8. A method of configuring a programmable HVAC system, the method comprising:
maintaining a database structured to store a plurality of template HVAC configuration profiles, each of the template HVAC configuration profiles including an attribute set including at least one of an equipment attribute, a climate attribute and a customer type attribute, and a plurality of HVAC system configuration parameters predetermined to provide HVAC system performance corresponding to the respective attribute set of the template configuration profile;
operating a server system in operative communication with the database to perform the acts of
transmitting one or more of the plurality of template HVAC configuration profiles to a client based upon a request received from the client, the request including a dealer/installer identification and at least one attribute of a template HVAC configuration profile,
receiving from the client a modification of at least one template HVAC configuration profile, the modification including a change to at least one of the plurality of HVAC system configuration parameters,
storing in the database a modified HVAC configuration profile including the modification received from the remote client, the modified HVAC configuration profile being associated with the dealer/installer identification,
receiving from the remote client an HVAC programming request, the programming request including the dealer/installer identification, an HVAC system identification, and an identification of the modified HVAC configuration profile, and
validating information of the modified HVAC configuration profile using a predetermined criterion, and
transmitting a programming instruction including the modified HVAC configuration profile to a remote electronically programmable HVAC controller associated with the HVAC system identification, the programming instruction being adapted to program the remote electronically programmable HVAC controller with the modified HVAC configuration profile.

9. The method of claim 8 further comprising storing in the database an HVAC system record including an identification of the modified HVAC configuration profile, the dealer/installer identification, and the HVAC system identification.

10. The method of claim 9 further comprising receiving HVAC system operation data from the remote electronically programmable thermostat, and storing the operation data in the HVAC system record of the database.

11. The system of claim 8 further comprising transmitting the HVAC system record to the remote client.

12. The system of claim 8 wherein the electronically programmable HVAC controller is an electronically programmable thermostat.

13. The system of claim 8, server system is in operatively communication with the electronically programmable HVAC controller via the public Internet.

14. An apparatus for configuring a programmable HVAC system, the apparatus comprising:
a data storage system structured to store a plurality of template HVAC configuration profiles, each of the template HVAC configuration profiles providing a predetermined HVAC system performance corresponding one or more attributes of a respective template configuration profile;
a computer system operatively coupled with the data storage system, the computer system being structured to:
receive from a remote client a modification of at least one template HVAC configuration profile transmitted to the remote client, the modification including a change to at least one of the plurality of HVAC system configuration parameters of the at least one template HVAC configuration profile transmitted to the remote client,
store in the data storage system a modified HVAC configuration profile incorporating the modification received from the remote client, the modified HVAC configuration profile being associated with a dealer/installer identification,
receive from the remote client an HVAC programming request, the programming request including the dealer/installer identification, an HVAC system identification, and an identification of the modified HVAC configuration profile, and
in response to the programming request transmit a programming instruction including the modified HVAC configuration profile to a remote electronically programmable HVAC controller associated with the HVAC system identification, the programming instruction being adapted to program the remote electronically programmable HVAC controller with the modified HVAC configuration profile.

15. The apparatus of claim 14 wherein each of the template HVAC configuration profiles includes an equipment attribute, a climate attribute, a customer type attribute, and a plurality of HVAC system configuration parameters predetermined to provide HVAC system performance corresponding to the respective equipment attribute, climate attribute and customer type attribute of the template configuration profile.

16. The apparatus of claim 14 wherein the computer system is structured to transmit one or more of the plurality of template HVAC configuration profiles to a remote client based upon a request received from the remote client, the request including a dealer/installer identification and at least one attribute of a template HVAC configuration profile.

17. The apparatus of claim 14, wherein the computer system is structured to validate the modification based upon at least one predetermined criterion for the plurality of HVAC system configuration parameters.

18. The apparatus of claim 14 wherein the computer system is further structured to store in the data storage system an HVAC system record including an identification of the modified HVAC configuration profile, the dealer/installer identification, and the HVAC system identification.

19. The apparatus of claim 14 wherein the computer system is further structured to:
   receive HVAC system operation data from the remote electronically programmable thermostat, and
   store the operation data in the HVAC system record of the data storage system.

20. The apparatus of claim 14 wherein the computer system is further structured to transmit the HVAC system record to the remote client.

\* \* \* \* \*